March 10, 1936.  E. O. HENDERSON  2,033,574
PIEPAN
Filed Aug. 17, 1935
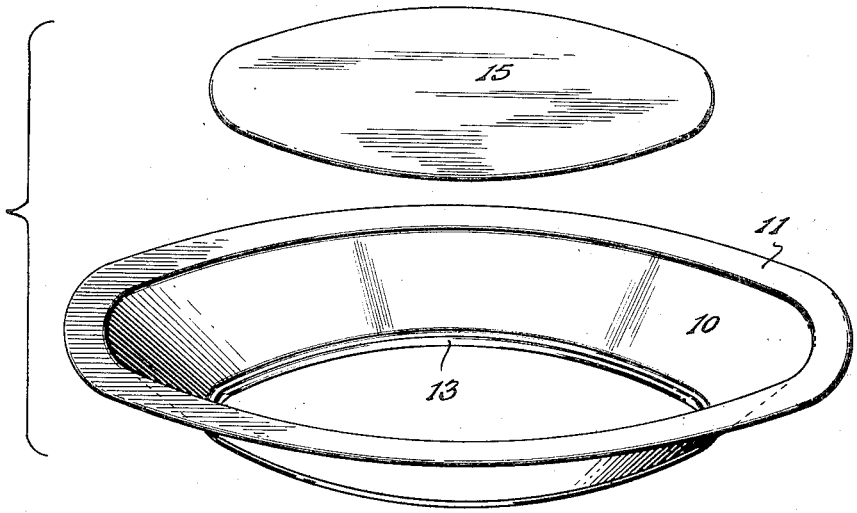
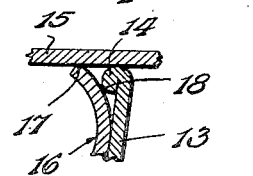
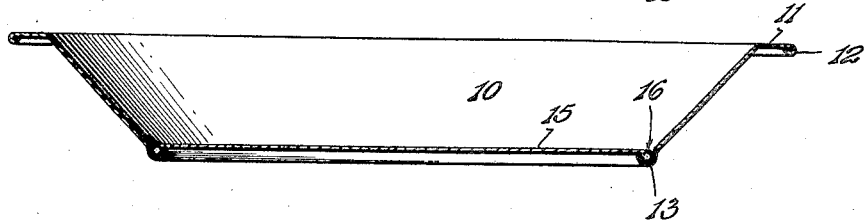
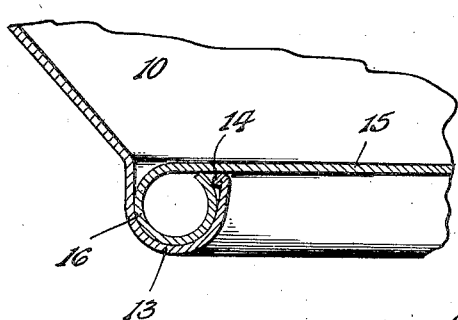
Inventor
Edward O. Henderson.
By Thos. H. Johnston
Attorney Patented Mar. 10, 1936

2,033,574

UNITED STATES PATENT OFFICE 2,033,574

PIEPAN

Edward O. Henderson, New Brighton, Pa.

Application August 17, 1935, Serial No. 36,742

6 Claims. (Cl. 53—6)

This invention relates to an improved pie pan although, if so desired, the invention may, with equal facility, be embodied in a cake pan or the like.

The invention seeks, as a salient object, to provide a pie pan wherein, after a pie is baked, the bottom wall of the pan may, while the pie is resting thereon, be readily released when the side wall of the pan may be slipped downwardly from around the pie so that the pie may thus be easily removed from the pan without breaking or mutilating the pie.

The invention seeks, as a further object, to provide a pan wherein, if so desired, the bottom wall of the pan may be employed as a supporting tray for the pie after being removed from the pan so that it will be unnecessary to disturb the pie by displacing the bottom wall of the pan therefrom.

A further object of the invention is to provide a pan wherein the conical side wall thereof will be provided at its smaller end with a resilient channel member to removably receive a bead on the bottom wall of the pan and wherein the free margin of said member will be stiffened to effectually grip said bead.

And the invention seeks, as a still further object, to provide a pan wherein the bead on the bottom wall of the pan will be rigid and unyielding, wherein the channel member on the side wall will be provided with a flange having a square corner adapted to impinge and grip the bead for detachably locking the parts together and wherein said flange will provide a fulcrum edge to coact with the bead as the bottom wall is displaced for flexing the channel member to release the bead.

Other and incidental objects of the invention not specifically mentioned in the foregoing will appear during the course of the following description and in the drawing forming a part of my application, Figure 1 is a perspective view of my improved pan, showing the bottom wall removed.

Figure 2 is a transverse vertical sectional view through the pan.

Figure 3 is an enlarged detail section.

Figure 4 is an enlarged detail section similar to Figure 3 but on a larger scale.

Referring now more particularly to the drawing, my improved pan includes an endless conical side wall 10 which is formed at its upper extremity with a rim 11 preferably terminating in a bead 12 which provides a smooth edge. Formed from the lower margin of the side wall 10 is an inturned endless annular channel member 13 substantially semi-cylindrical in cross section. Formed from the upper margin of the free side wall of the channel member 13 is an inturned flange 14 which is pressed flat against said wall and provides a smooth edge at the upper extremity thereof.

In conjunction with the side wall 10 of the pan I provide a flat bottom wall 15, both walls preferably being formed of suitable resilient sheet metal. Formed from the peripheral margin of the bottom wall 15 is a downwardly rolled endless annular bead 16 substantially cylindrical in cross section. The bottom wall is of a diameter to be snugly received within the small end of the side wall 10 so that, as shown in Figure 2, the bead 16 fits snugly within the channel member 13 for connecting the bottom wall with said side wall.

Attention is now directed to the fact that the bead 16 is of a cross sectional external diameter somewhat greater than the internal horizontal width of the channel member 13. Consequently, when the bead is seated in the channel member, said member is flexed or expanded somewhat by the bead. For all practical effect, flexing takes place solely in the channel member by reason of the fact that, as brought out in Figure 4, the bead 16 is formed with a square outer corner 17 which impinges the bottom wall 15 and is adapted to bite into said wall for limiting the free margin of the bead against movement under radial pressure thereon.

The bead 16 being rigid and unyielding, as explained, to cause all the flexing to take place in the channel member 13 when the bead is seated therein, the free inner side wall of the channel member is thus brought under tension to grip the bead and it is now to be noted that the flange 14 is formed with a square outer corner 18 which is held by the tension of said wall to bite into the bead at a point above the horizontal center line thereof. The flange 14 will thus serve to yieldably lock the bead 16 within the channel member 13 so that the bottom wall 15 will not easily become accidentally displaced. The pan may, accordingly, be freely handled without likelihood of displacing the bottom wall. By engaging the thumbs over the rim of the pan at opposite points, however, and pressing upwardly against the bottom wall with the fingers, the bead 16 may be caused to ride out of the channel member 13, when the side wall 10 may be slipped downwardly from around a pie so that the pie will remain intact resting on the bottom wall which may, if so desired, then be employed as a tray for the pie.

It is realized that as the channel member 13 is endless and annular, very little flexing can take place without buckling but practical tests have shown that the flexing is sufficient to hold the square corner 18 of the flange 14 tightly against the bead 16. The flange 14 will, of course, serve to stiffen the channel member 13 at its free edge as well as reinforce the free margin of said member to prevent fracture and, as will now be seen, the corner 18 of said flange will provide a fulcrum edge with which the bead 16 will coact for flexing the channel member 13 as the bottom wall is pushed upwardly and the bead rides out of said member to release the bottom wall. The release of the bottom wall is thus greatly facilitated so that said wall may be detached from the side wall without breaking a pie within the pan.

Having thus described the invention, I claim:

1. A baking pan including a tapered side wall provided at its smaller end with a resilient channel member having a free margin, a bottom wall having a peripheral bead removably seated in said member for detachably connecting the bottom wall with the side wall, and means carried by the free margin of the channel member yieldably locking the bead within said member.

2. A baking pan including a tapered side wall provided at its smaller end with a resilient channel member having a free margin, a bottom wall having a peripheral bead removably seated in said member for detachably connecting the bottom wall with said side wall, said bead being substantially cylindrical in cross section and having a free edge providing a square corner impinging the bottom wall to coact therewith for resisting radial pressure on the bead, and means carried by the free margin of the channel member and yieldably urged by said member to impinge the bead near the free edge thereof for removably locking the bead within said member.

3. A baking pan including a tapered side wall provided at its smaller end with a resilient channel member having a free margin, a bottom wall having a peripheral bead removably seated in said member for detachably connecting the bottom wall with the side wall, and means carried by the free margin of said member to provide a fulcrum edge yieldably urged by the member to impinge the bead.

4. A baking pan including a tapered side wall provided at its smaller end with a resilient channel member having a free margin, a bottom wall having a peripheral bead removably seated in said member for detachably connecting the bottom wall with the side wall, said bead being substantially cylindrical in cross section, and a reinforcing flange carried by the free margin of said member and providing a fulcrum edge yieldably urged by the member to impinge the bead at a point above the horizontal center line thereof for removably locking the bead within said member.

5. A baking pan including a conical side wall provided at its smaller end with a resilient annular channel member having a free side wall formed at its upper edge with an inturned reinforcing flange, and a bottom wall formed with a peripheral downwardly rolled annular bead removably seated in said member for detachably connecting the bottom wall with said side wall, said flange having a free edge providing a square corner yieldably urged by the member to impinge the bead closely adjacent the bottom wall for removably locking the bead within said member.

6. A baking pan including a tapered side wall provided at its smaller end with a resilient channel member having a free margin, a bottom wall having a peripheral bead removably seated in said member for detachably connecting the bottom wall with the side wall, and a reinforcing and stiffening flange formed on the free margin of the channel member to lay close thereto.

EDWARD O. HENDERSON.